United States Patent
Iwato (10) Patent No.: US 10,261,354 B2
(45) Date of Patent: Apr. 16, 2019

(54) LIQUID CRYSTAL DISPLAY DEVICE

(71) Applicant: Panasonic Liquid Crystal Display Co., Ltd., Hyogo (JP)

(72) Inventor: Hiroaki Iwato, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 15/345,557

(22) Filed: Nov. 8, 2016

(65) Prior Publication Data
US 2017/0052403 A1 Feb. 23, 2017

Related U.S. Application Data

(63) Continuation of application No. PCT/JP2014/002478, filed on May 9, 2014.

(51) Int. Cl.
*G02F 1/1333* (2006.01)
*G02F 1/1337* (2006.01)
(Continued)

(52) U.S. Cl.
CPC ...... *G02F 1/133345* (2013.01); *G02F 1/1337* (2013.01); *G02F 1/1339* (2013.01);
(Continued)

(58) Field of Classification Search
CPC .............. G02F 1/133345; G02F 1/1337; G02F 1/1339; G02F 1/136286; G02F 1/13439;
(Continued)

(56) References Cited

U.S. PATENT DOCUMENTS

2004/0150776 A1* 8/2004 Kim ...................... G02F 1/1339
349/138
2006/0146255 A1 7/2006 Ahn
(Continued)

FOREIGN PATENT DOCUMENTS

JP 2007-322627 12/2007
JP 2008-26345 2/2008
(Continued)

OTHER PUBLICATIONS

International Search Report dated Jul. 15, 2014 in International (PCT) Application No. PCT/JP2014/002478.

*Primary Examiner* — Charles S Chang
(74) *Attorney, Agent, or Firm* — Wenderoth, Lind & Ponack, L.L.P.

(57) ABSTRACT

A liquid crystal display device includes an annular seal located between a first substrate and a second substrate, and a liquid crystal layer sealed in a space surrounded by the first substrate, the second substrate, and the annular seal. The first substrate includes a first metal layer, a first insulating layer covering the first metal layer, a second metal layer formed on the first insulating layer, a second insulating layer covering the second metal layer, a third metal layer formed on the second insulating layer, a third insulating layer covering the third metal layer, an alignment layer arranged on the third insulating layer, and a display region where a plurality of pixels are formed. At least one recessed groove is formed in the third insulating layer and is located at a region between the display region and the annular seal.

4 Claims, 12 Drawing Sheets

(51) Int. Cl.
*G02F 1/1339* (2006.01)
*G02F 1/1343* (2006.01)
*G02F 1/1362* (2006.01)
*G02F 1/1368* (2006.01)

(52) U.S. Cl.
CPC ........ *G02F 1/1343* (2013.01); *G02F 1/13439* (2013.01); *G02F 1/136286* (2013.01); *G02F 1/1368* (2013.01); *G02F 2001/136295* (2013.01); *G02F 2201/121* (2013.01); *G02F 2201/123* (2013.01)

(58) Field of Classification Search
CPC .................. G02F 1/1343; G02F 1/1368; G02F 2001/136295; G02F 2201/121; G02F 2201/123
See application file for complete search history.

(56) References Cited

U.S. PATENT DOCUMENTS

| | | |
|---|---|---|
| 2007/0279565 A1 | 12/2007 | Iwato et al. |
| 2008/0018848 A1 | 1/2008 | Iwato et al. |
| 2008/0137022 A1* | 6/2008 | Komeno ............... G02F 1/1337 349/153 |
| 2009/0261334 A1 | 10/2009 | Ahn |
| 2009/0323005 A1 | 12/2009 | Ota |
| 2010/0014042 A1 | 1/2010 | Komeno et al. |
| 2010/0079718 A1* | 4/2010 | Sekiya ............. G02F 1/133512 349/153 |

FOREIGN PATENT DOCUMENTS

| | | |
|---|---|---|
| JP | 2008-145461 | 6/2008 |
| JP | 2010-8758 | 1/2010 |

* cited by examiner

LIQUID CRYSTAL DISPLAY DEVICE

CROSS-REFERENCE TO RELATED APPLICATION

This application is a bypass continuation of international patent application PCT/JP2014/002478, filed: May 9, 2014 designating the United States of America, the entire disclosure of which is incorporated herein by reference.

TECHNICAL FIELD

The present disclosure relates to a liquid crystal display device.

BACKGROUND

When an orientation film material for controlling a direction (orientation) of liquid crystal molecules is spread on a surface of a substrate included in a liquid crystal display and reaches a region between a sealing material for sealing a liquid crystal material and the surface of the substrate, an adhesiveness between the surface of the substrate and the sealing material is deteriorated, thus giving rise to a drawback that a liquid crystal material may leak.

Prior arts disclose a technology that suppresses the spreading by wetting of an orientation film with recessed grooves which are formed inside a region where the sealing material is arranged and outside the display region by etching a second insulating layer covering a second conductive layer including a plurality of video signal lines, or by etching a first insulating layer covering a first conductive layer including a plurality of scanning signal lines and the second insulating layer (See Japanese unexamined published patent application Nos. 2008-26345 and 2007-322627)

In the technology disclosed in the prior arts, because the first conductive layer and the second conductive layer are exposed at a bottom area of the recessed grooves, transparent conductive material included in a conductive layer is formed inside the recessed grooves. However, it is difficult to arrange the recessed grooves in a region which overlaps a plurality of wirings made of the first conductive layer and the second conductive layer, because a voltage inside the recessed grooves is common with the transparent conductive material. In other words, in this technology, the region where the recessed grooves are arranged is limited by an arrangement of wirings made of the first conductive layer and the second conductive layer.

SUMMARY

An object of present disclosure is to provide a liquid crystal display device which suppresses the spreading by wetting of an orientation film from reaching a region where the sealing material is formed, without being limited by an arrangement of wirings made of the first conductive layer including scanning single lines and the second conductive layer including video signal lines.

In one general aspect, the instant application describes a liquid crystal display device including a first substrate, a second substrate opposed to the first substrate, an annular seal located between the first substrate and the second substrate, and a liquid crystal layer sealed in a space surrounded by the first substrate, the second substrate, and the annular seal. The first substrate includes a first metal layer including a plurality of scanning signal lines, a first insulating layer covering the first metal layer, a second metal layer including a plurality of video signal lines, the second metal being formed on the first insulating layer, a second insulating layer covering the second metal layer, a third metal layer including a plurality of common lines, the third metal being formed on the second insulating layer, a third insulating layer covering the third metal layer, an alignment layer arranged on the third insulating layer, the alignment layer contacting to the liquid crystal layer, and a display region where a plurality of pixels are formed, one pixel is defined by two of the plurality of scanning signal lines and two of the plurality of video signal lines. At least one recessed groove is formed in the third insulating layer and is located at a region between the display region and the annular seal.

The above general aspect may include one or more of the following features. The at least one recessed groove may be a continuous groove completely surrounding the display region in the plan view and extending across each of the plurality of video signal lines and the plurality of scanning signal lines.

The at least one recessed groove may be a plurality of recessed grooves including a first recessed groove completely surrounding the display region and a second recessed groove completely surrounding the display region. The first recessed groove may be closer to the display region than the second recessed groove in the region between the display region and the annular seal.

The at least one recessed groove may be a plurality of arrays of recessed grooves including a first array of recessed grooves and a second array of recessed grooves. The first array of recessed grooves may include a plurality of recessed grooves arranged around the display region in the plan view, each adjacent pair of the plurality of recessed grooves of the first array being separated by a space. The second array of recessed grooves may include a plurality of recessed grooves arranged around the display region in the plan view, each adjacent pair of the plurality of recessed grooves of the second array being separated by a space. Each of the spaces between the recessed grooves of the first array is adjacent to one of the recessed grooves of the second array in the plan view. The first array of recessed grooves is closer to the display area than the second array of recessed grooves in the region between the display region and the annular seal in the plan view.

The liquid crystal display device may further include an organic insulating layer formed between the second insulating layer and the third insulating layer. The at least one recessed groove may be formed in the third insulating layer and the organic insulating layer.

At least one opening may be formed in the organic insulating layer between the display region and the at least one recessed groove. The at least one opening may has a length extending in a direction from the display region to the at least one recessed groove that is greater than a width of the at least one opening that is orthogonal to the direction.

The liquid crystal display device may further include a plurality of pixel electrodes formed between the second insulating film and the third insulating film. The at least one recessed groove may be covered by a transparent conductive film. The transparent conductive film is a same layer with the plurality of pixel electrodes.

A part of one of the plurality of scanning signal lines may be branched into a plurality branched wirings. The at least one opening overlaps the plurality of branched wirings in plan view.

In the configuration of the display device of the present disclosure, the liquid crystal display device is able to suppress the spreading by wetting of an orientation film from reaching the region where the sealing material is formed, without limitation of the arrangement of wirings made of the first conductive layer and the second conductive layer, because the bottom area of the recessed grooves is positioned on or above the second insulting layer which covers the second conductive layer.

DETAILED DESCRIPTION OF THE PREFERRED EMBODIMENT

Hereinafter, an exemplary embodiment of the present disclosure will be described with reference to the drawings. Here, in all drawings for explaining the embodiments, parts having identical functions are given the same symbol and their repeated explanation is omitted.

First Embodiment

Figure 1:
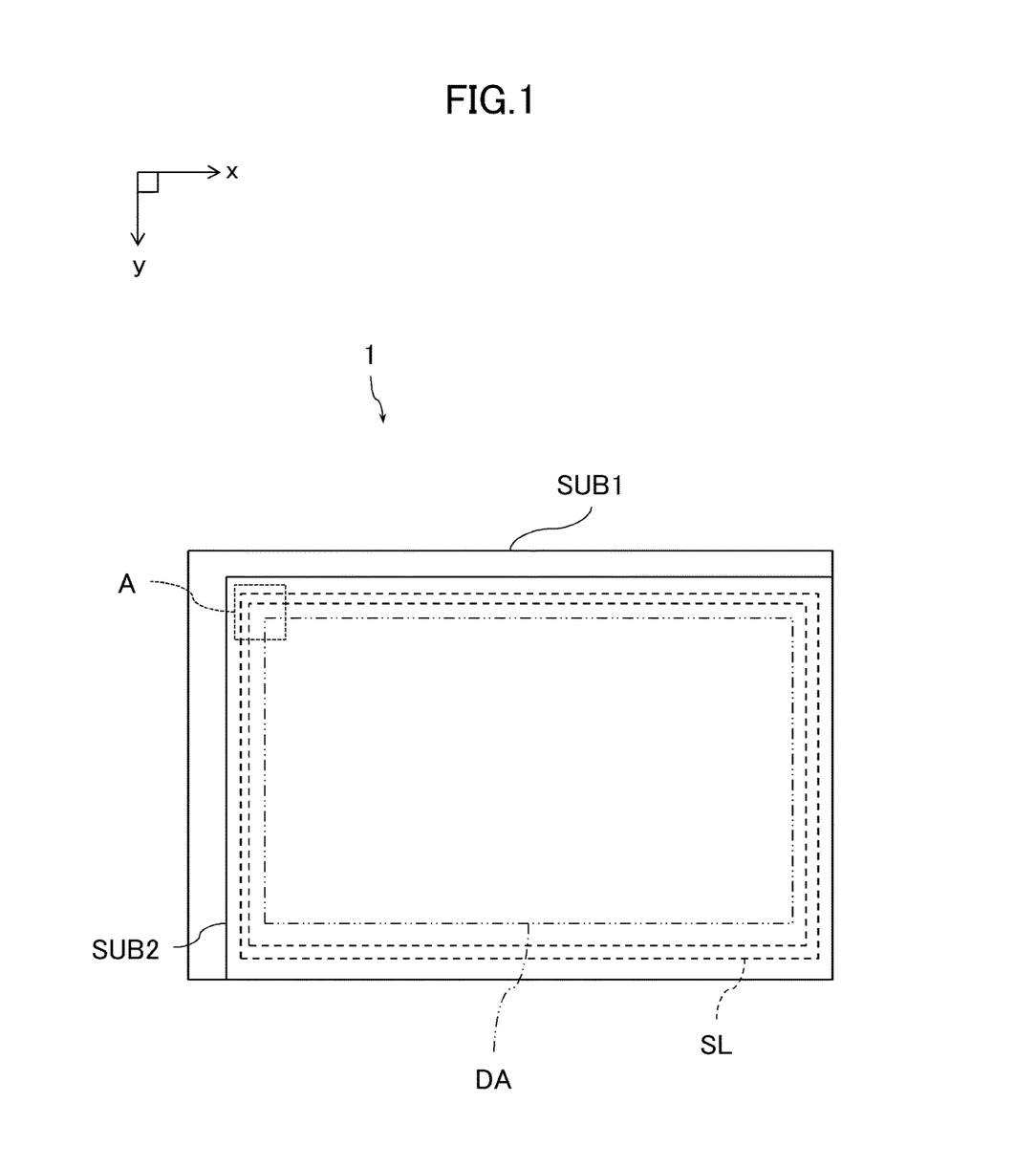
FIG. 1 is a schematic plan view showing a constitution of a liquid crystal display panel of a first embodiment.

FIG. 1 is a schematic plan view showing a schematic constitution of a liquid crystal display device of the first embodiment. The liquid crystal display device 1 according to the present embodiment is, so-called an IPS mode, a transverse electric field drive mode liquid crystal display device which includes a first substrate and a second substrate opposed to each other. The first substrate SUB1 is mainly referred to as a TFT substrate where wirings and TFT elements (not shown in FIG. 1) are arranged on a surface of a transparent electrode which is made of a glass or the like. The second substrate SUB2 is mainly referred to as a color filter substrate where a red (R) color filter, a green (G) color filter and a blue (B) color filter (not shown in FIG. 1) are arranged on a surface of a transparent electrode which is made of a glass and so on. An annular sealing material is arranged between the first substrate SUB1 and the second substrate SUB2, and a liquid crystal material (not shown in FIG. 1) is sealed in a space surrounded by the first substrates SUB1, the second substrate SUB2 and a seal SL formed by the annular sealing material. Here, a display region DA for displaying an image is formed in a region surrounded by the seal SL.

In the display region DA, for example, a plurality of scanning signal lines GL and a plurality of common lines CL which extend in the x direction and a plurality of video signal lines DL which extend in the y direction are formed (not shown in FIG. 1). Each scanning signal line GL is connected to a scanning sign driver (not shown) arranged outside of the display region DA at a side edge of the first substrate SUB1 parallel with the y direction. Each video signal line DL is connected to a video sign driver (not shown) arranged outside of the display region DA at a side edge of the first substrate SUB1 parallel with the x direction. A region surrounded by two neighboring scanning signal lines GL and two neighboring video signal lines DL corresponds to one pixel which is a unit for forming an image, and a TFT element, a pixel electrode and a common electrode are formed in each pixel (not shown in FIG. 1).

Figure 2:
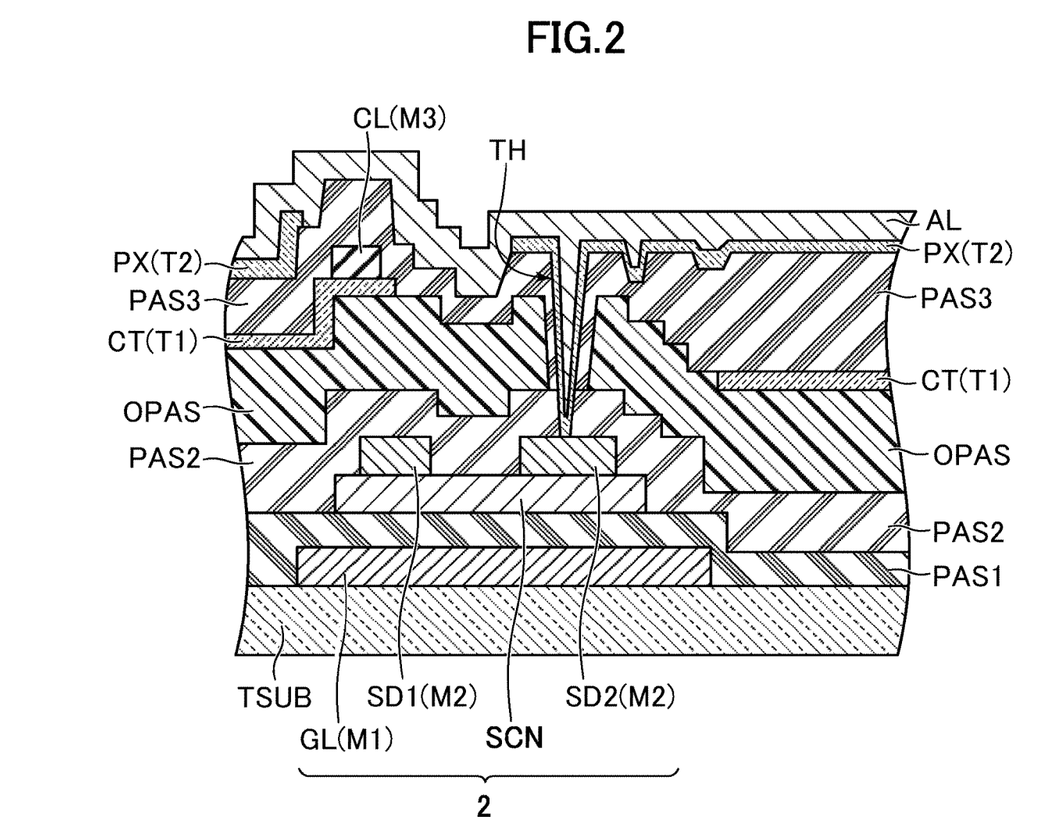
FIG. 2 is a schematic cross-sectional view of a part of a display region.

Next, a cross-sectional structure on the first substrate SUB1 will be described. FIG. 2 is a schematic cross-sectional view of a part of a display region DA in the first substrate SUB1. As illustrated in FIG. 2, the scanning signal line GL is formed on a transparent substrate TSUB. The scanning signal line GL is included in a first metal layer M1 formed by a metal, such as copper, on the transparent substrate TSUB. The scanning signal line GL is formed by etching the first metal layer M1 with a known technique of photolithography.

A first insulting film PAS1 is formed overlapping the first metal layer M1 and is made of silicon nitride or the like. The video signal line DL (not shown in FIG. 2) is formed on the first insulating layer PAS1. The video signal line DL is included in a second metal layer M2 formed by a metal such as copper, on the transparent substrate TSUB. The video signal line DL is formed by etching the second metal layer M2 with a known technique of photolithography.

The second metal layer M2 includes a drain electrode SD1 and a source electrode SD2 of a TFT element 2. Then, a semiconductor SCN which functions as channel of the TFT element 2 is arranged in contact with the drain electrode SD1 and the source electrode SD2. Here, the semiconductor layers SC are made of amorphous silicon (a-Si), for example.

A second insulating layer PAS2 made of silicon nitride or the like is arranged on and overlaps the second metal layer M2 and the semiconductor SCN. On the second insulating layer PAS2, a common electrode CT is formed. The common electrode CT is included in a first transparent electrode T1 made of a transparent conductive material, ITO or the like. The common electrode CT is formed by etching the first transparent electrode T1 with a known technique of photolithography.

A common line CL is formed in contact with the common electrode CT. The common line CL is included in a third metal layer M3 made of a metal, such as copper or the like, and is arranged over the second insulating layer PAS2. The common lines CL are formed by etching the third metal layer M3 with a known technique of photolithography. As illustrated in FIG. 2, an organic insulating layer OPAS which is made of an acrylic resin may be laminated to cover the second insulating layer PAS2.

A third insulating layer PAS3 made of silicon nitride or the like is arranged on and covers the first transparent conductive layer T1 and the third metal layer M3. On the third insulating layer PAS3, a pixel electrode PX is formed. The pixel electrode PX is included in a second transparent electrode T2 made of a transparent conductive material, ITO or the like. The pixel electrode PX is formed by etching the second transparent electrode T2 with a known technique of photolithography. A through hole TH is formed in a part of a region where the pixel electrode PX and the source electrode SD2 overlap, and the pixel electrode PX and the source electrode SD2 are connected with each other through layers therebetween. Also, slits are formed in a part of the pixel electrode which is opposed to the common electrodes (not shown).

An alignment layer AL is arranged on the second transparent electrode T2 and the third insulating layer PAS3. The alignment layer AL is arranged on an interface with the liquid crystal material, and has a function of aligning liquid crystal molecules. The alignment layer AL is made of a resin layer, for example, polyimide or the like.

The alignment layer AL is formed in the display region DA and a marginal region in a peripheral of the display region DA on a surface of the second transparent conductive layer 12 and the third insulating layer PAS3 by printing a resin material in a liquid form using an inkjet printing method, and applying rubbing treatment to the surface. The inkjet printing method has an advantage of low contamination and the like due to a non-contact process, but a viscosity of the material for the inkjet printing method is unlikely to be so high that the material may be spread by wetting from the printed area toward a sealing region where a seal SL is arranged.

A recessed groove GT is provided at the first substrate SUB1 for suppressing the spreading by wetting of the alignment layer material. The recessed groove will be described in reference with figures as follows.

Figure 3:
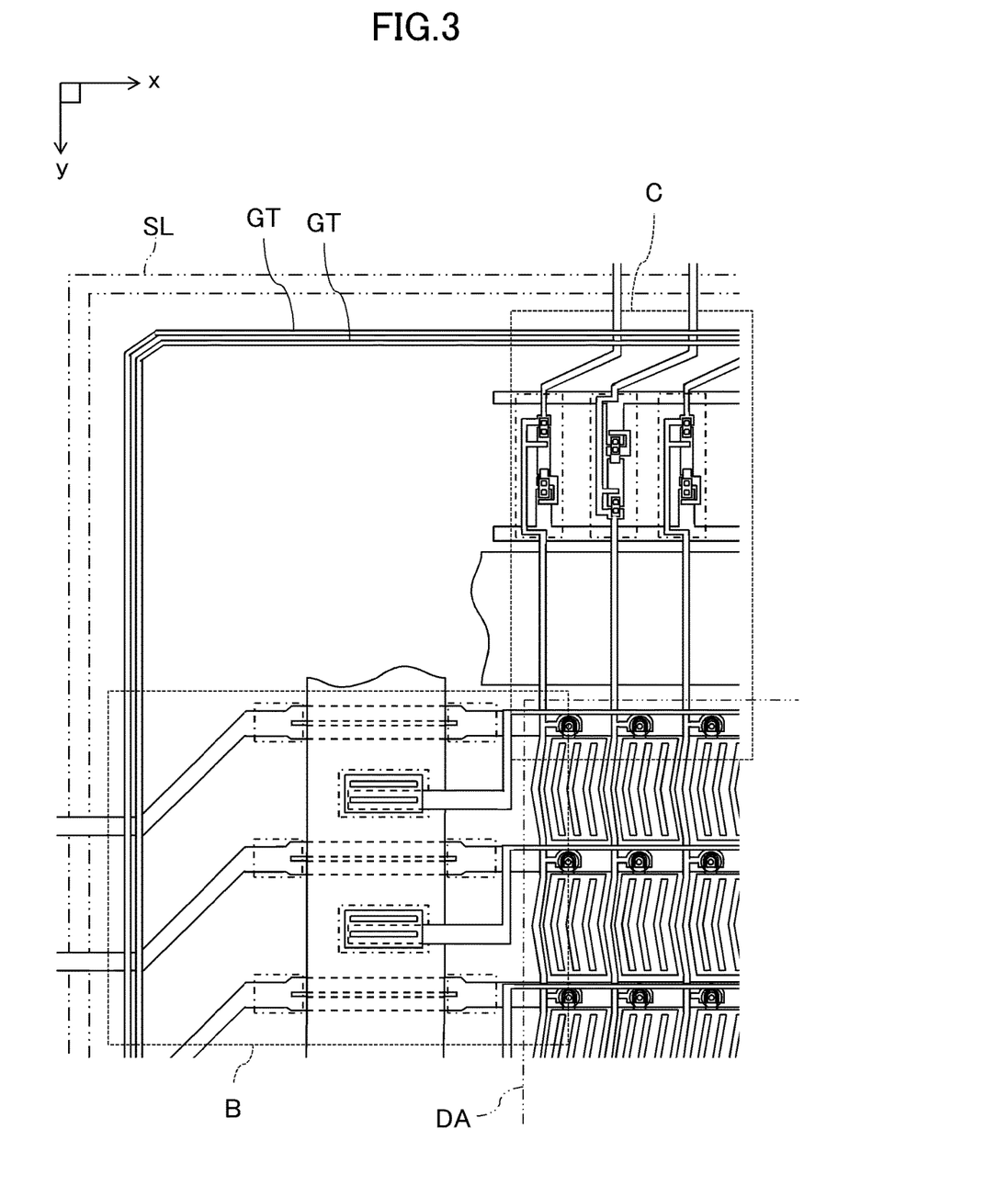
FIG. 3 is a schematic enlarged view of the region A shown in FIG. 1.
Figure 4:
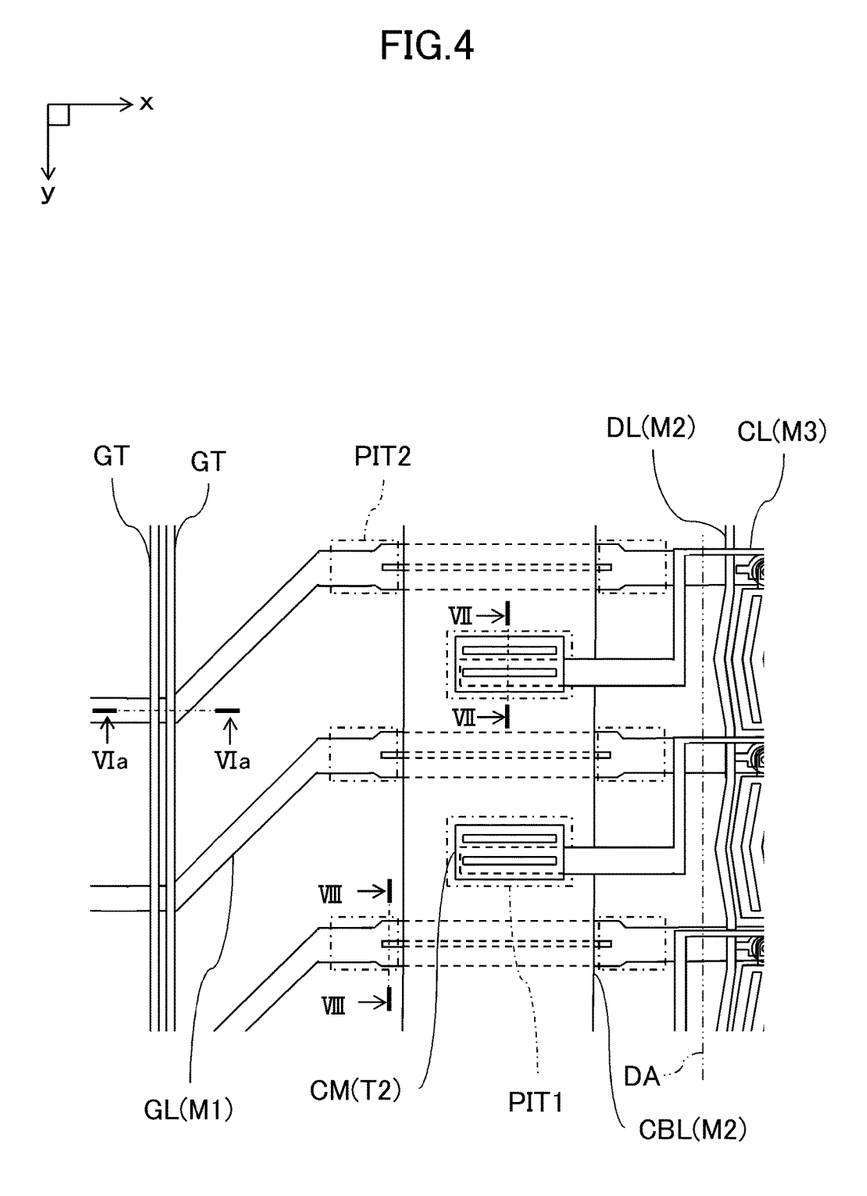
FIG. 4 is a schematic enlarged view of the region B shown in FIG. 3.
Figure 5:
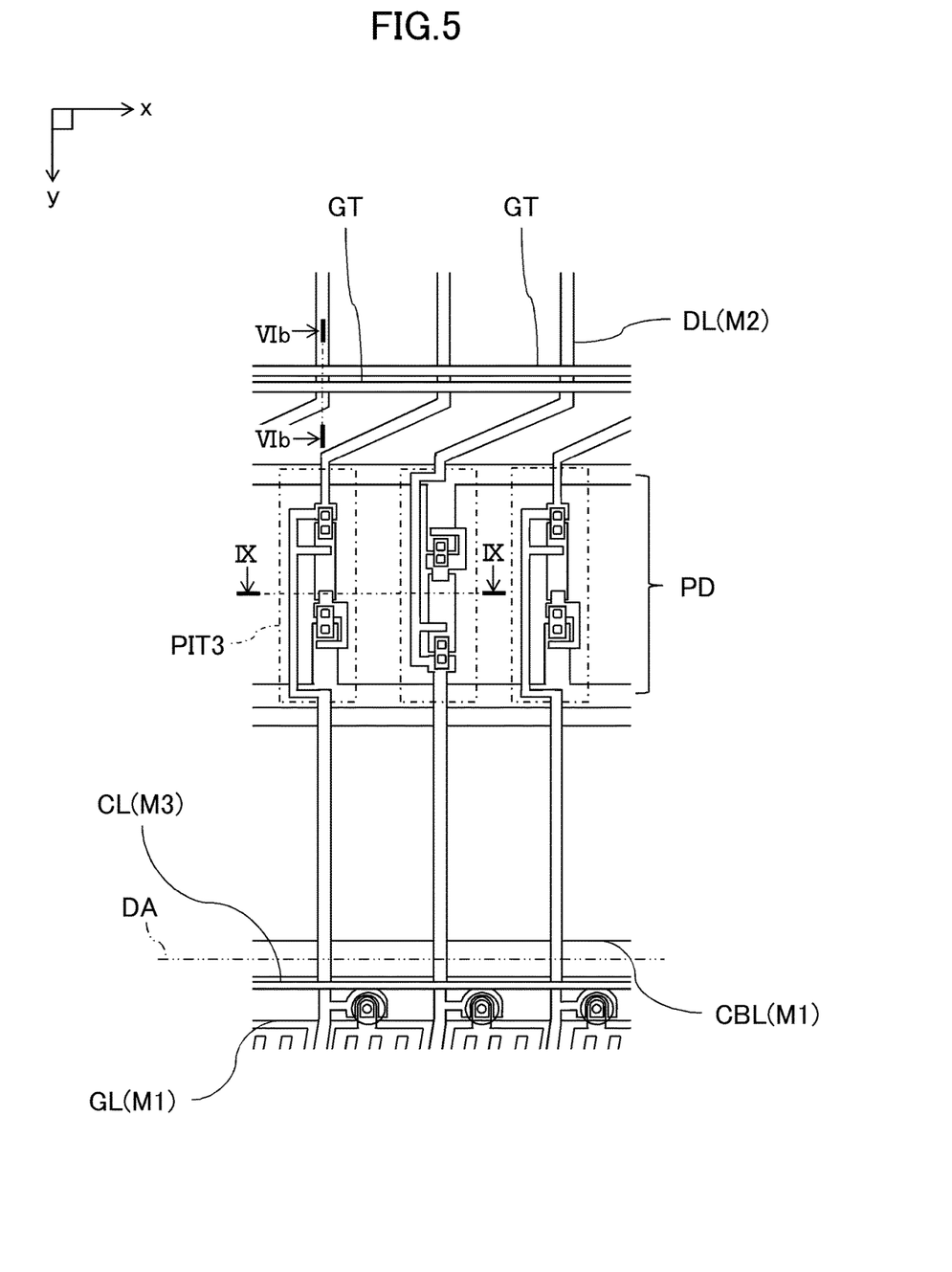
FIG. 5 is a schematic enlarged view of the region C shown in FIG. 3.

FIG. 3 is a schematic enlarged view of the region A shown by a dashed line of the first substrate SUB1 in FIG. 1. FIGS. 4 and 5 are schematic enlarged views of the regions B and C shown by dashed lines in FIG. 3, respectively. As illustrated in these figures, the recessed grooves GT are formed along the seal SL between the display region DA and the seal SL of the first substrate SUB1. According to the first embodiment, two arrays of recessed grooves GT are formed along the seal SL at different locations from the display region DA towards the seal SL. The recessed grooves GT are formed overlapping the scanning signal lines GL which are included in the first metal layer M1 and the video signal lines DL which are included in the second metal layer M2. Also, the recessed grooves GT may be positioned closer to the seal SL than oblique line portions of the scanning signal lines GL and the video signal lines DL. The oblique line portions of the scanning signal lines GL and the video signal lines DL are portions of the scanning signal lines GL and the video signal lines DL which extend obliquely with respect to the x direction and the y direction outside of the display region DA, because the scanning signal lines GL and the video signal lines DL are bound and connected to a plurality of scanning signal drivers (not shown) and video signal drivers (not shown) disposed outside the seal SL.

Figure 6A:
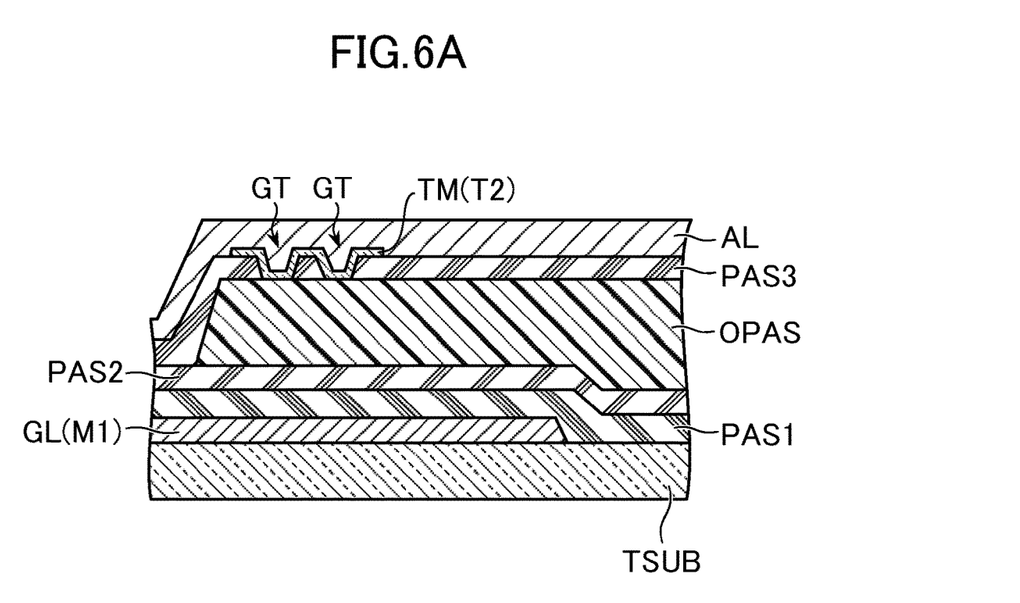
FIG. 6A is a schematic cross-sectional view taken along a line VIa-VIa in FIG. 4.
Figure 6B:
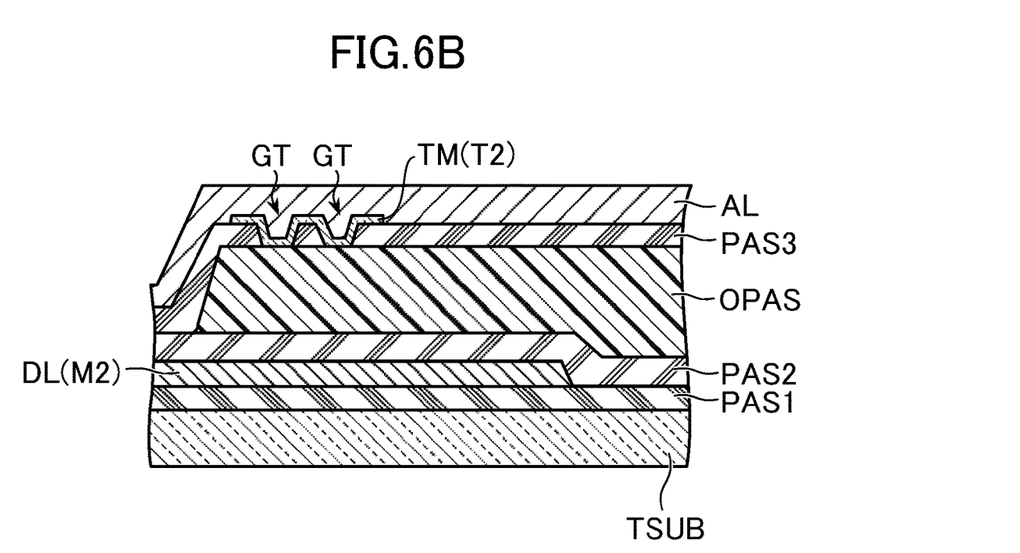
FIG. 6B is a schematic cross-sectional view taken along a line VIb-VIb in FIG. 5.

FIG. 6A is a schematic cross-sectional view taken along a line VIa-VIa in FIG. 4, and FIG. 6B is a schematic cross-sectional view taken along a line VIb-VIb in FIG. 5. These figures illustrate cross-sectional views of the recessed grooves GT. As illustrated in FIGS. 6A and 6B, the recessed grooves GT are formed by etching parts of third insulating layer PAS3 and the depth of the recessed grooves GT corresponds to a thickness of removed third insulating layer PAS3. Bottom areas of the recessed grooves GT are positioned on an upper area of the organic insulating layer OPAS, and are beyond the second insulating layer PAS2. A transparent conductive material TM which is included in the second transparent electrode layer T2 is formed at an inner area and a periphery of the recessed grooves GT. The third insulating layer PAS3 is removed by etching the third insulating layer PAS3 with the known technique of photolithography. Here, the third insulating layer PAS3 is made of an inorganic material such as silicon nitride. On the other hand, the organic insulating layer OPAS is made of an organic material such as acrylic resin or the like. Therefore, the third insulating layer PAS3 and the organic insulating layer OPAS can be etched independently.

An alignment layer material which is spread from the display region DA toward the seal SL is trapped inside these recessed grooves GT. The recessed grooves GT can prevent spreading by wetting of the alignment layer material from reaching the region where the seal SL is arranged. Thus, they can lead to a reduced distance between the display region DA and the seal SL, and a small bezel can be realized. In FIGS. 6A and 6B, the alignment layer AL is formed in covering the third insulating layer PAS3 and these recessed grooves GT.

An ITO made transparent conductive material TM formed in and around the recessed grooves GT has a rough surface and low wettablility for the alignment layer material, whereby spreading by wetting the alignment layer material can be further suppressed.

Because the bottom areas of the recessed grooves GT are positioned at the same layer as or over the second insulating layer PAS2, the recessed grooves GT can be designed irrespective of wirings which are included in the first metal layer M1 and the second metal layer M2.

By the way, an even thickness of the alignment layer material is required inside the display region DA to provide a quality image. In other words, the spreading by wetting of the alignment layer material is suppressed from reaching the sealing region where the seal SL is arranged. On the other hand, the alignment layer material is preferably spread between the display region DA and the recessed grooves GT without any retaining.

An area between the recessed grooves GT and the display region DA in the first substrate SUB1 will be described as follows. As illustrated in FIGS. 4 and 5, some openings PIT1 to PI13 (each indicated by a dashed line) are formed in a surface of the third insulating layer PAS3 between the display region DA and the recessed grooves GT.

These openings PIT1 to PI13 are formed beyond holes by which the organic insulating layer OPAS is partially removed.

Figure 7:
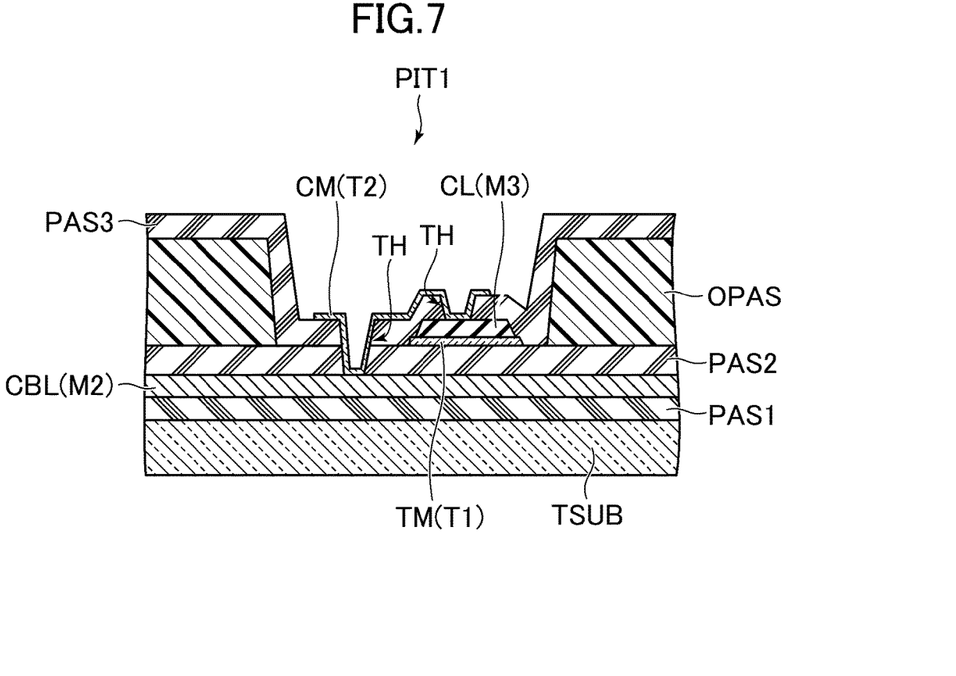
FIG. 7 is a schematic cross-sectional view taken along a line VII-VII in FIG. 4.

Openings PIT1 are formed between neighboring scanning signal lines GL in and overlapping the common voltage supply line CBL in plan view which is included in the second metal layer M2. FIG. 7 is a schematic cross-sectional view taken along a line VII-VII in FIG. 4 and corresponds to a cross-sectional view of the opening PIT1. According to FIGS. 4 to 7, inside the openings PIT1, the common voltage supply line CBL is connected through layers therebetween with common line CL, which is included in the third metal layer M3, with the interlayer connecting component CM, which is included in the second transparent electrode layer 12. Here, because the organic insulating layer OPAS is thicker than the other insulating layers, when through holes TH are formed in the organic insulating layer OPAS, the formation of the interlayer connecting component CM is difficult. Thus, as described above, the organic insulating layer OPAS is removed in a position where the through hole TH is formed.

Figure 8:
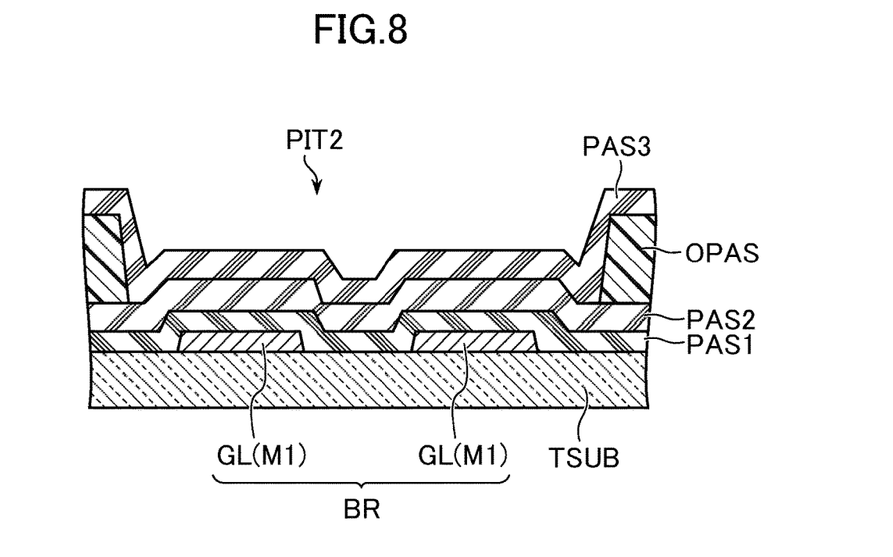
FIG. 8 is a schematic cross-sectional view taken along a line VIII-VIII in FIG. 4.

Openings PIT2 are formed around positions where the scanning signal lines GL and the common voltage supply lines CBL cross in plan view. FIG. 8 is a schematic cross-sectional view taken along a line VIII-VIII in FIG. 4 and corresponds to a cross-sectional view of the openings PIT2. According to FIGS. 4 to 8, branch wirings BR of the scanning signal lines GL are arranged inside the openings PIT2 in plan view.

Here, the branch wirings BR will be described. The branch wirings BR are formed by branching of the scanning signal lines GL. The branch wirings BR are arranged around points where the scanning signal lines GL and the common voltage supply lines CBL cross. The scanning signal lines GL included in the first metal layer M1 and the common voltage supply line CBL included in the second metal layer M2 are insulated by the first insulating layer PAS1, but they may become short-circuited for some reason. The branch wirings BR are designed to repair a short circuit which has occurred.

For example, in branch wirings BR illustrated in FIG. 8, when a branch wiring BR is short-circuited with the common voltage supply line CBL, the short-circuited branch wiring BR is cut. The short-circuited branch wiring BR can be detached by cutting the branch wiring BR at two points on opposite sides of a point where the common voltage supply line CBL crosses the branch wiring BR. This detaching process is conducted by laser irradiating the branch wiring BR from a side of the third insulating layer PAS3. Here, the organic insulating layer OPAS has been removed at a position which the laser is irradiated so as to prevent the irradiated laser from scattering due to the organic insulating layer OPA which is thicker than the other insulating layers.

Figure 9:
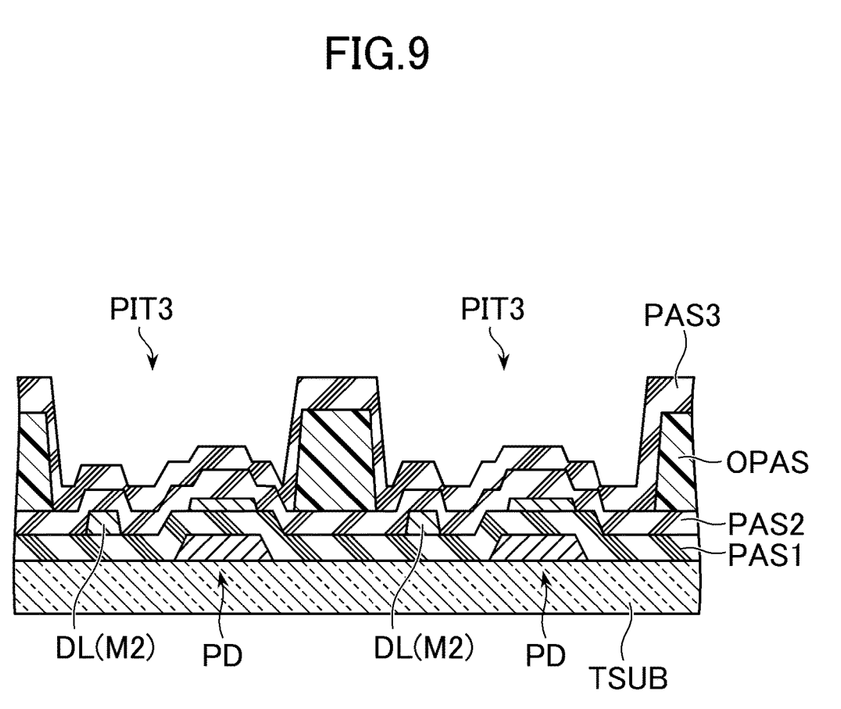
FIG. 9 is another schematic cross-sectional view taken along a line IX-IX in FIG. 5.

An opening PIT3 is formed at every video signal line DL between the display region DA and the oblique line portions of the video signal lines DL. FIG. 9 is a schematic cross-sectional view taken along a line IX-IX in FIG. 5 and corresponds to a cross-sectional view of the opening PIT3. According to FIGS. 5 to 9, an electrostatic protection circuit PD is formed within the opening PIT3 to prevent excess current from entering into the display region DA. The electrostatic protection circuit PD is made of both the first metal layer M1 and the second metal layer M2, and includes a portion which connects between the first metal layer M1 and the second metal layer M2 by the interlayer connecting component CM included in the second transparent electrode layer 12. Thus, even when the electrostatic protection circuit PD is disposed, the organic insulating layer OPAS is removed, similar to locations where connections occur between the common voltage supply line CB and the common line CL through layers therebetween.

As illustrated in FIGS. 4 and 5, a length of each opening PIT 1 to PIT3 in a direction from the display region DA to the seal SL in plan view is greater than that in a direction in which the seal SL extends. In other words, openings PIT 1 to PIT3 are arranged in a manner that their length-wise directions are arranged along a direction of spreading of the alignment layer material. Therefore, openings PIT 1 to PIT3 which are arranged between the display region DA and the recessed grooves GT are able to suppress the alignment layer material from being detained between the display region DA and the recessed grooves GT without impeding spreading the alignment layer material. Therefore, the alignment layer material can be spread evenly in the area between the display region DA and the recessed grooves GT and a thickness of the alignment layer material is even inside the display region DA, thereby improving the image quality.

According to the first embodiment, although it illustrates a case where two arrays of recessed grooves GT are formed along the seal SL in different locations from the display region DA towards the seal SL, the number of arrays of the recessed grooves GT may be one or more than two. The recessed groove GT may be formed surrounding annularly the display region DA and may be formed partially between the display region DA and the seal SL.

FIGS. 10A-12B are other schematic cross-sectional views taken along a line VIa-VIa and a line VIb-VIb in FIGS. 4 and 5 and correspond to other configurations of the recessed grooves GT.

Figure 10A:
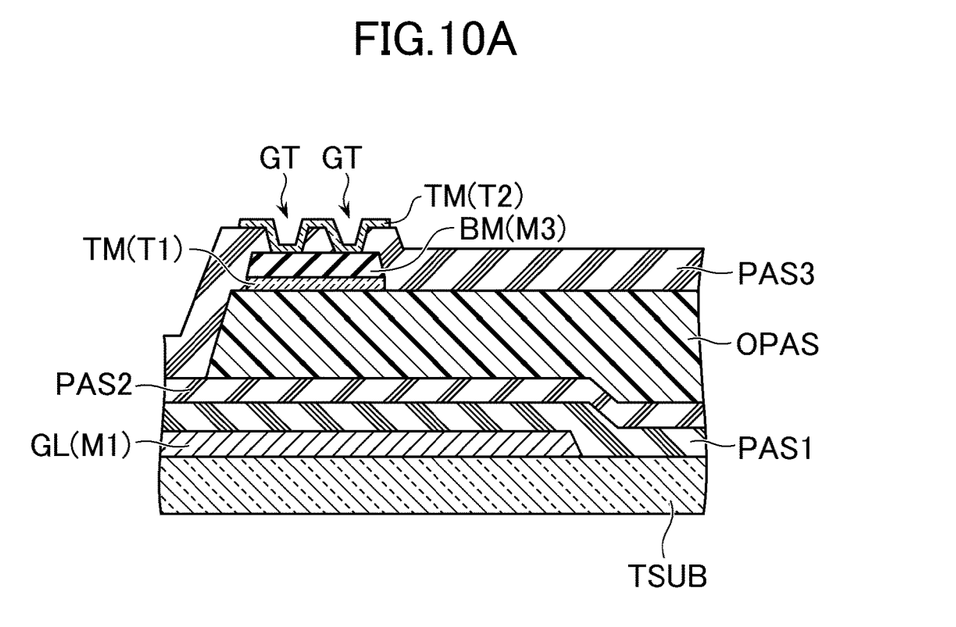
FIG. 10A is another schematic cross-sectional view taken along a line VIa-VIa in FIG. 4.
Figure 10B:
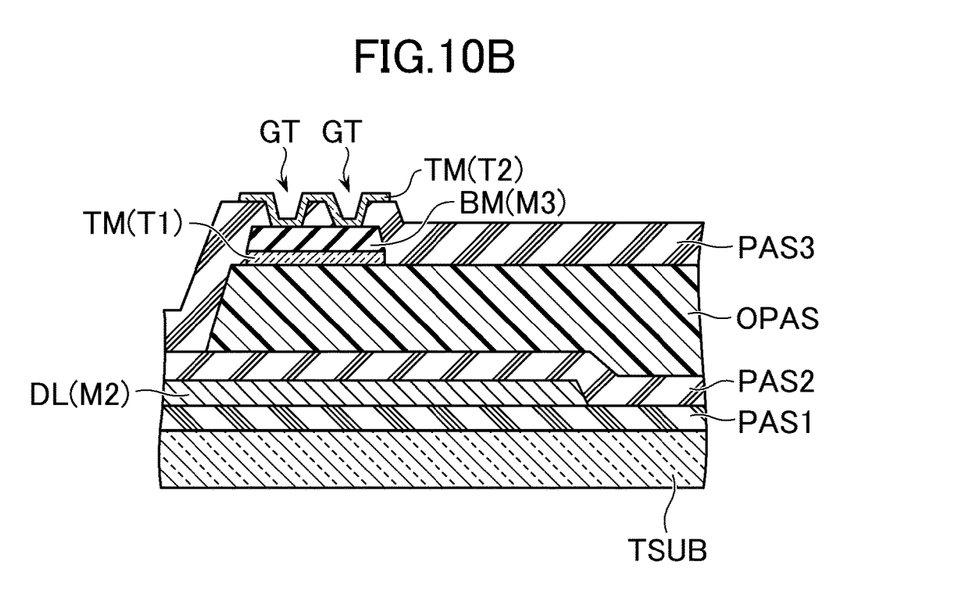
FIG. 10B is another schematic cross-sectional view taken along a line VIb-VIb in FIG. 5.

As illustrated in FIGS. 10A and 10B, the recessed grooves GT are formed on the groove bottom member BM included in the third metal layer M3. A step is created by a thickness of the groove bottom member BM. This step can suppress the alignment layer material from spreading by wetting. With this, the effect of suppressing the alignment layer material from spreading by wetting can be enhanced. Also, the groove bottom member BM functions as a bottom area of the recessed grooves GT, and it can play a role of shielding an electric field created by current flowing in the scanning signal line GL or the video signal line DL by arranging the groove bottom member BM beyond the scanning signal lines GL and the video signal lines DL.

Figure 11A:
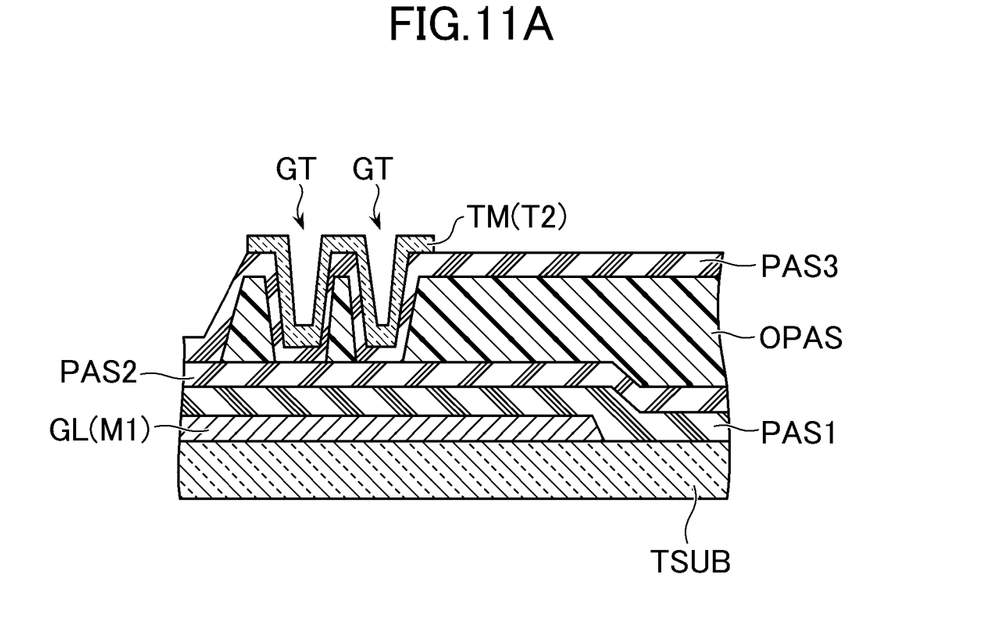
FIG. 11A is another schematic cross-sectional view taken along a line VIa-VIa in FIG. 4.
Figure 11B:
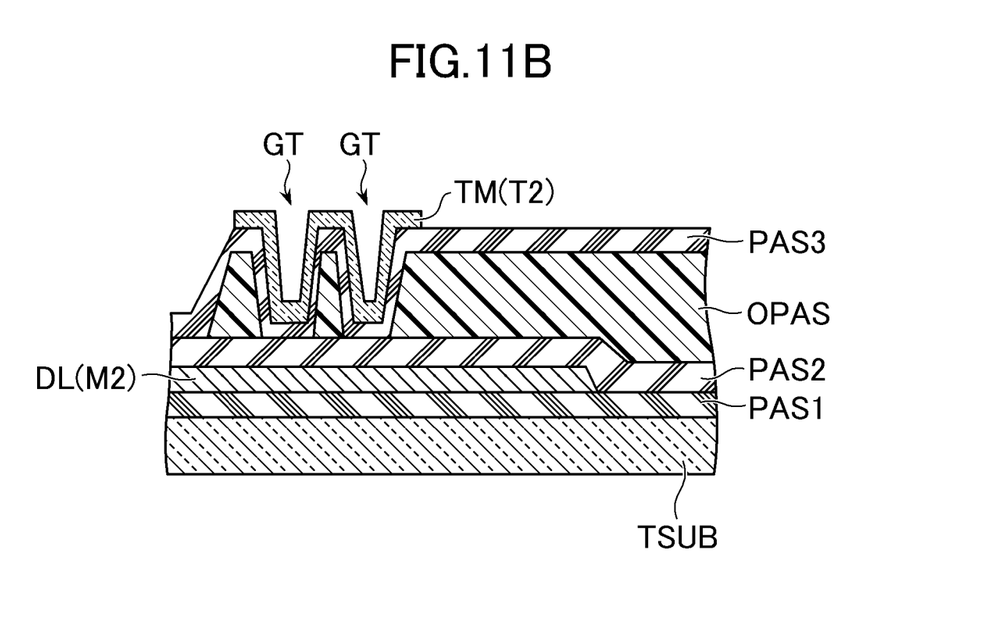
FIG. 11B is another schematic cross-sectional view taken along a line VIb-VIb in FIG. 5.

As examples illustrated in FIGS. 11A and 11B, the recessed grooves GT are constituted by holes which are formed by removing a part of the organic insulating layer OPAS. The recessed grooves GT are formed by laminating the third insulating layer PAS3 after etching the organic insulating layer OPAS with a known technique of photolithography. A depth of the recessed groove GT corresponds to a thickness of the removed organic insulating layer OPAS. In general, because the organic insulating layer OPAS is thicker than the third insulating layer PAS3, the depth of the recessed groove GT in this example is deeper than that of a recessed groove formed by removing a part of only the third insulating layer PAS3. Thus, the effect of suppressing the spreading by wetting of the alignment layer material can be enhanced.

Figure 12A:
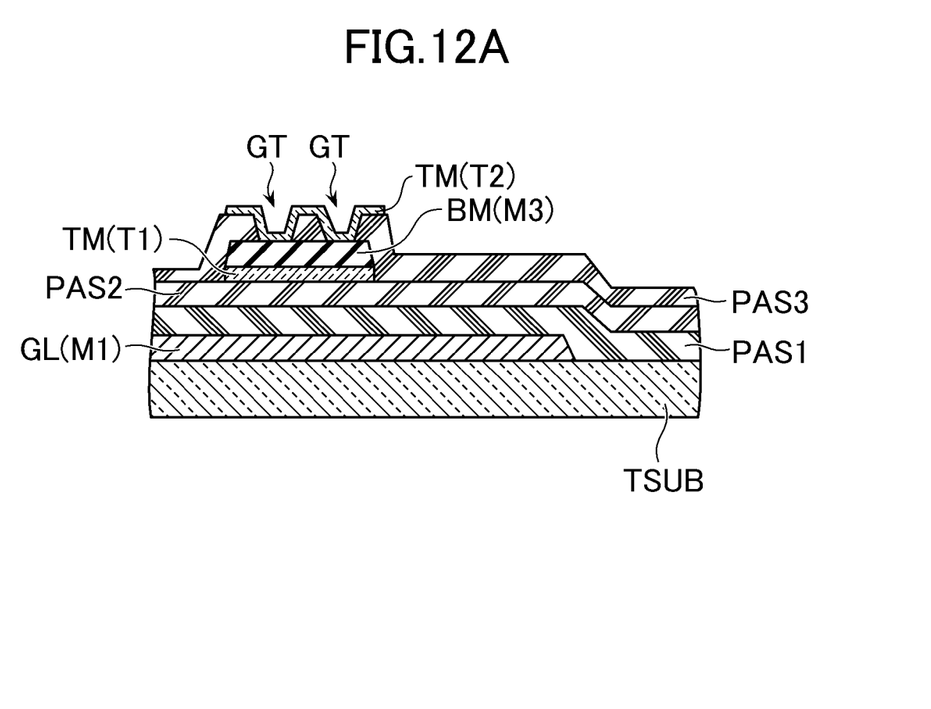
FIG. 12A is another schematic cross-sectional view taken along a line VIa-VIa in FIG. 4.
Figure 12B:
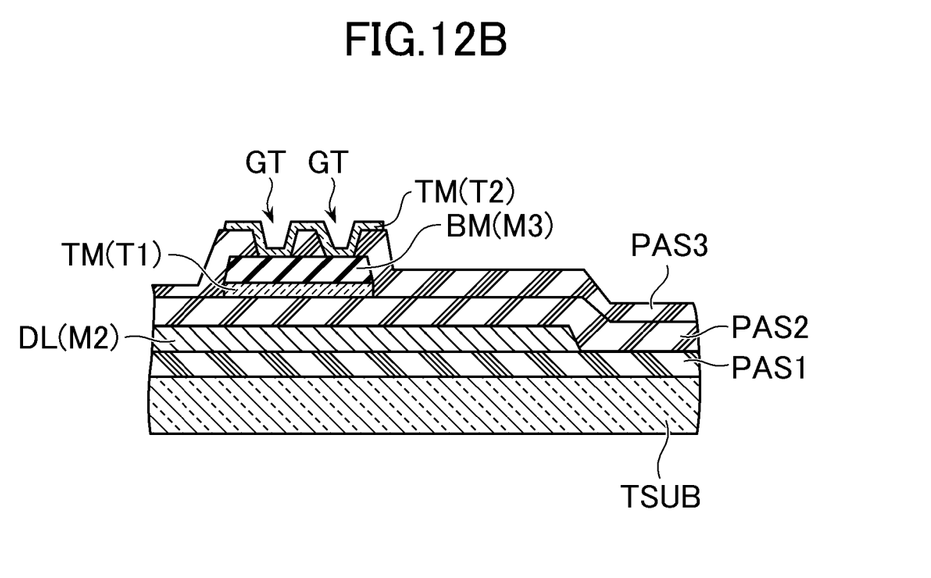
FIG. 12B is another schematic cross-sectional view taken along a line VIb-VIb in FIG. 5.

As examples illustrated in FIGS. 12A and 12B, although the organic insulating layer OPAS is not formed between the third insulating layer PAS3 and the second insulating layer PAS2, recessed grooves GT are formed beyond the groove bottom member BM which is included in the third metal layer M3. Thus, etching the third insulating layer PAS3 in order to form the recessed grooves GT does not affect the second insulating layer PAS2. Further, similar to the examples illustrated in FIGS. 10A and 10B, a step is formed on a surface of the third insulating layer PAS3, thereby enhancing the effect of suppressing the spreading by wetting of the alignment layer material.

Second Embodiment

Figure 13:
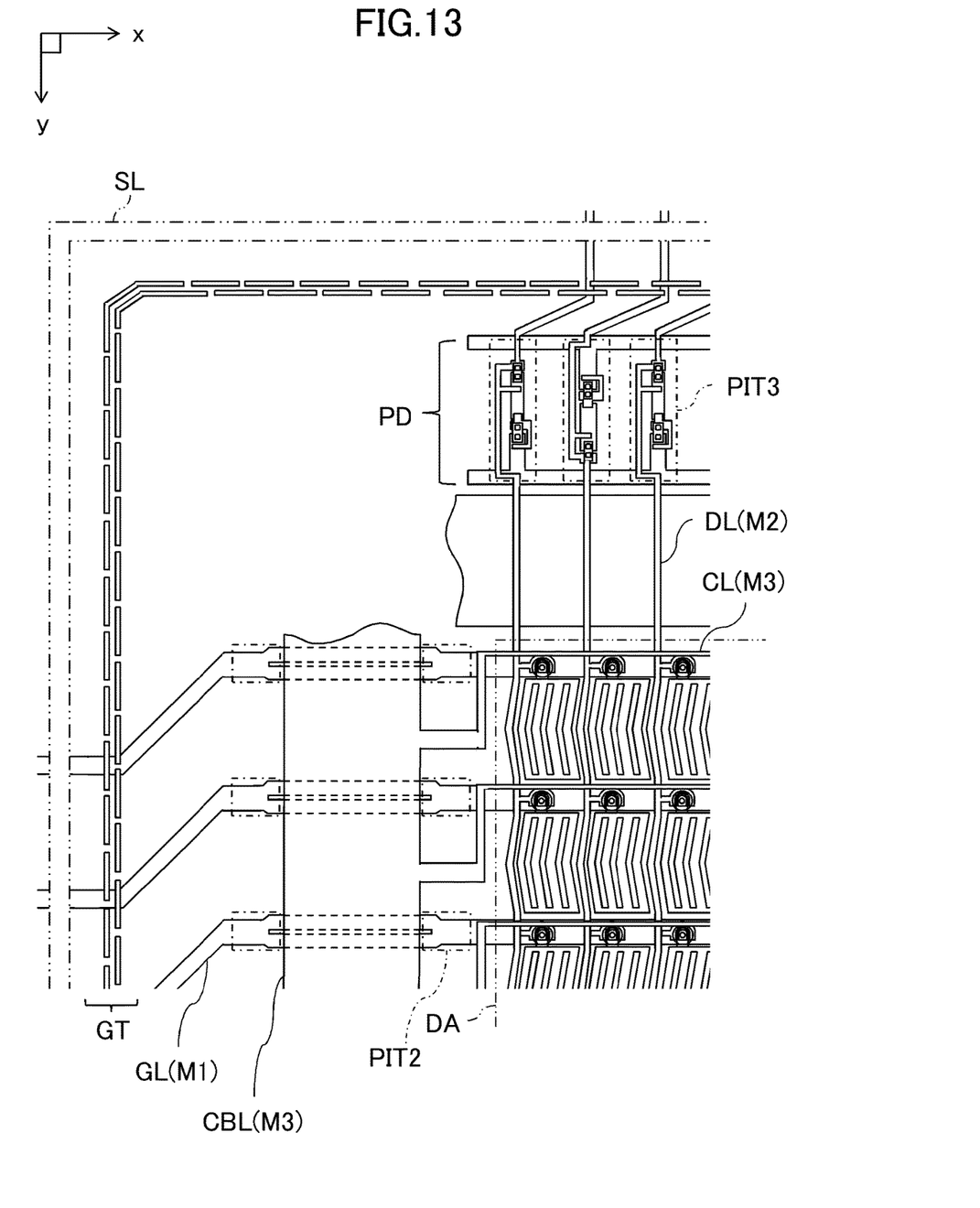
FIG. 13 is a schematic plan view showing the schematic constitution of a liquid crystal display panel of another embodiment.

FIG. 13 is a schematic plan view showing a constitution of a liquid crystal display panel of another embodiment. For convenience, the components having the same function as that of the first exemplary embodiment are designated by the same reference mark, and their description is omitted.

According to the second embodiment, plural arrays of recessed grooves GT are arranged along the seal SL in different locations from the display region DA towards the seal SL. In this embodiment, two arrays of recessed grooves GT will be described, but the number of arrays is not limited to two, and it may be more than two.

For convenience, in FIG. 13, an array of recessed grooves GT which is located closer to the display region DA is called an inner groove array, and an array of recessed grooves GT which is located closer to the seal SL is called an outer groove array. As illustrated in FIG. 13, in a view from the display region DA toward the seal SL, recessed grooves GT of the outer groove array are arranged between adjacent recessed grooves GT of the inner groove array. Each recessed groove GT is arranged in a manner that a space between two adjacent recessed grooves of the inner groove array does not overlap a space between two adjacent recessed grooves of the outer groove array in a view from the display region DA. A length in a direction of the seal SL of each recessed groove GT of the outer groove array is longer than a length in the same direction of the space between two adjacent recessed grooves of the inner groove array. In other words, the recessed grooves GT of the inner groove array and the recessed grooves GT of the outer groove array are arranged in a manner that each of the recessed grooves GT of the inner groove array and each of recessed grooves GT of the outer groove array overlap with each other in a view from the display region DA toward the seal SL.

An alignment layer material which reaches an area where the recessed grooves GT are formed may be trapped in the recessed grooves GT or may be spread by wetting toward a further outer area by going around the recessed grooves GT. Therefore, a path of the alignment layer material which is spread by wetting between the recessed grooves GT toward the further outer area turns in an x or y direction multiple times by this arrangement of the recessed grooves GT according to the second embodiment. Thereby, a speed of the spreading by wetting of the alignment layer material is slowed, and then the spreading by wetting of the alignment layer material is able to be suppressed. As an overlapping portion between the recessed grooves GT of the inner groove array and the recessed grooves GT of the outer groove array is longer, a distance in the direction of the seal SL which the alignment layer material flows is longer. Thereby, the spreading by wetting of the alignment layer material is able to be further suppressed. Because a cross sectional structure in the recessed groove GT according the second embodiment is similar with that in the first embodiment, this description is omitted.

As illustrated in FIG. 13, common voltage supply line CBL for providing a common voltage is included in the third metal layer M3, so the common line CL and the common voltage supply line CBL are formed continuously in the third metal layer M3. Thereby, openings for connecting through layers between the common line CL and the common voltage supply line CBL are not required in the third insulating layer PAS3. In comparison with an example where openings are formed, a surface of the third insulating layer PAS3 is move even between the display region DA and the recessed grooves GT, which further suppresses the alignment layer material from spreading.

Although exemplary embodiments of the present disclosure are described above, the present disclosure is not limited to these exemplary embodiments. It is noted that other embodiments properly changed from the exemplary embodiments described above by those skilled in the art without departing from the scope of the present disclosure are fully supported by the present disclosure.

For example, in the example of removing a part of organic insulating layer OPAS, the third insulating layer PAS3 may also be removed when the recessed grooves GT are formed. It may make depths of recessed grooves GT deeper. With this, the effect of suppressing the spreading of wetting of the alignment layer material can be further enhanced.

What is claimed is:
1. A liquid crystal display device comprising:
a first substrate;
a second substrate opposed to the first substrate;
an annular seal located between the first substrate and the second substrate; and
a liquid crystal layer sealed in a space surrounded by the first substrate, the second substrate, and the annular seal,
wherein the first substrate comprises:
a first metal layer including a plurality of scanning signal lines;
a first insulating layer covering the first metal layer;
a second metal layer including a plurality of video signal lines, the second metal layer being formed on the first insulating layer;
a second insulating layer covering the second metal layer;
a third metal layer including a plurality of common lines, the third metal layer being formed on the second insulating layer;
a third insulating layer covering the third metal layer;
an alignment layer arranged on the third insulating layer, the alignment layer contacting to the liquid crystal layer; and
a display region where a plurality of pixels are formed, one pixel being defined by two of the plurality of scanning signal lines and two of the plurality of video signal lines,
wherein at least one recessed groove is formed in the second insulating layer and is located at a region between the display region and the annular seal, and
wherein the third insulating layer covers the at least one recessed groove.

2. The liquid crystal display device according to claim 1, wherein
the at least one recessed groove is a continuous groove completely surrounding the display region in plan view and extending across each of the plurality of video signal lines and the plurality of scanning signal lines.

3. The liquid crystal display device according to claim 2, wherein
the at least one recessed groove is a plurality of recessed grooves including a first recessed groove completely surrounding the display region and a second recessed groove completely surrounding the display region, and
the first recessed groove is closer to the display region than the second recessed groove in the region between the display region and the annular seal.

4. The liquid crystal display device according to claim 1, wherein
the at least one recessed groove is a plurality of arrays of recessed grooves including a first array of recessed grooves and a second array of recessed grooves,
the first array of recessed grooves includes a plurality of recessed grooves arranged around the display region in plan view, each adjacent pair of the plurality of recessed grooves of the first array being separated by a space, the second array of recessed grooves includes a plurality of recessed grooves arranged around the display region in the plan view, each adjacent pair of the plurality of recessed grooves of the second array being separated by a space, wherein each of the spaces between the recessed grooves of the first array is adjacent to one of the recessed grooves of the second array in the plan view, and wherein the first array of recessed grooves is closer to the display area than the second array of recessed grooves in the region between the display region and the annular seal in the plan view.

\* \* \* \* \*